(12) United States Patent
Currle et al.

(10) Patent No.: US 6,767,042 B2
(45) Date of Patent: Jul. 27, 2004

(54) WINDBREAK FOR A CONVERTIBLE

(75) Inventors: Joachim Currle, Stuttgart (DE); Frank Fruehauf, Aichwald (DE); Alexander Moessner, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/930,491

(22) Filed: Aug. 16, 2001

(65) Prior Publication Data

US 2002/0027372 A1 Mar. 7, 2002

(30) Foreign Application Priority Data

Aug. 16, 2000 (DE) .......................................... 100 39 791

(51) Int. Cl.[7] .............................................. B62D 35/00
(52) U.S. Cl. ..................................... 296/85; 296/180.1
(58) Field of Search ................................ 296/85, 180.1

(56) References Cited

U.S. PATENT DOCUMENTS

| | | | | |
|---|---|---|---|---|
| 925,141 A | * | 6/1909 | Smith | |
| 1,275,400 A | * | 8/1918 | Crowell | |
| 1,297,764 A | * | 3/1919 | Wildau | |
| 2,514,082 A | * | 7/1950 | Menrath | |
| 2,639,188 A | * | 5/1953 | Saurer | |
| 3,246,923 A | * | 4/1966 | Turner | |
| 4,850,637 A | * | 7/1989 | Carlino | 296/180.1 |
| 5,024,481 A | * | 6/1991 | Swersky | 296/180.1 |
| 5,195,799 A | * | 3/1993 | Gotz et al. | 296/180.1 |
| 5,318,337 A | * | 6/1994 | Gotz et al. | 296/180.1 X |
| 5,338,089 A | * | 8/1994 | Gotz et al. | 296/180.5 |
| 5,702,150 A | * | 12/1997 | Reuter et al. | 296/180.1 |
| 5,791,725 A | * | 8/1998 | Swersky | 296/180.1 |
| 5,810,424 A | * | 9/1998 | Kuttner et al. | 296/180.1 |
| 5,899,521 A | * | 5/1999 | Pfertner et al. | 296/180.1 |
| 6,092,860 A | * | 7/2000 | Zankl et al. | 296/180.1 |
| 6,095,590 A | * | 8/2000 | Matsuda et al. | 296/180.1 |
| 6,193,298 B1 | * | 2/2001 | Swersky | 296/85 |
| 6,257,653 B1 | * | 7/2001 | Swersky | 296/180.1 |
| 2001/0030447 A1 | * | 10/2001 | Schmitt | 296/85 X |

FOREIGN PATENT DOCUMENTS

| | | | |
|---|---|---|---|
| DE | 3738500 | | 12/1988 |
| DE | 3821031 | | 12/1989 |
| DE | 38 21 031 | * | 12/1989 |
| DE | 41 10 204 | * | 12/1991 |
| DE | 40 18 862 | * | 1/1992 |
| DE | 4119529 | * | 12/1992 |
| DE | 4 320 4200 | * | 12/1994 |
| DE | 19705682 | | 8/1998 |
| DE | 19810865 | | 9/1999 |
| DE | 19836473 | | 2/2000 |
| EP | 0 340 796 | * | 5/1989 |
| GB | 2 182 010 | * | 5/1987 |
| JP | 4-100731 | * | 4/1992 |

* cited by examiner

*Primary Examiner*—Joseph D. Pape
(74) *Attorney, Agent, or Firm*—Crowell & Moring LLP

(57) ABSTRACT

A convertible in which at least one vehicle seat is assigned a windbreak. In this case, the at least one windbreak is adapted in shape and position to occupants who are on the vehicle seats, an aerodynamic air-guiding device being provided at least in one part of the region bounding the windbreak.

46 Claims, 6 Drawing Sheets

WINDBREAK FOR A CONVERTIBLE

BACKGROUND AND SUMMARY OF THE INVENTION

This application claims the priority of German Patent Document 100 39 791.3, filed Aug. 16, 2000, the disclosure of which is expressly incorporated by reference herein.

The present invention relates to a convertible in which at least one vehicle seat is assigned a windbreak.

In the case of convertibles known in practice, there is inserted in the rear passenger compartment, level with the vehicle belt line, a plate-shaped covering from whose front edge a windbreak protrudes approximately vertically upwards which extends over the entire width of the vehicle and is supported laterally against the roll bar. A windbreak of this type is intended to protect the occupants, and, in particular, the head neck and shoulders of the occupants, against annoying swirling of the airstream flowing in from behind. A windbreak of this type is disclosed, for example, in German Patent Document DE 37 38 500 A1. However, a windbreak causes an even higher negative pressure to arise in the cab, as a result of which the shearing layer of the flow formed behind the front roof cross member is shifted downwards in the direction of the cab and constitutes an increased risk of an air draft due to the airstream from the front.

In German Patent Document DE 198 10 865 A1, a convertible is disclosed having a windbreak which is arranged behind a row of seats, extends upwards over the latter and preferably runs over the entire width of the interior, with additional measures for feeding air from the region behind the windbreak into the passenger compartment being provided. For this purpose, the intention is for at least the upper part of the windbreak, approximately from shoulder height to above the head height of the vehicle occupants, to be formed from a transparent material, preferably a glass pane. As a measure for feeding air from the rear region of the windbreak into the passenger compartment, at least one air duct is provided which originates from a region behind the windbreak and opens into regions of the passenger compartment in which the recirculated air is not found to be annoying by the vehicle occupants.

A windbreak of this type which is transparent—at least in the upper region—can advantageously result in unimpeded visibility for the vehicle occupants, in particular for the driver looking rearwards. At the same time, an air duct which is described in this laid-open specification ensures that air accumulating on the rear side of the windbreak is recirculated in a controlled manner into the passenger compartment, and, as a result, the negative pressure in the vehicle cab is compensated for. However, the air-passage arrangement described in this publication is relatively complicated and requires a relatively high structural outlay which leads to high costs.

Taking these convertibles known from the prior art as a starting point, an object of the present invention is to provide a windbreak in a convertible in such a manner that the negative pressure in the vehicle cab is compensated for without the occupants being subjected to a draft.

According to certain preferred embodiments of the present invention, an object is achieved in the case of a convertible of the type described at the beginning by at least one windbreak being adapted to an occupant who is on the vehicle seat, an aerodynamic air-guiding device being provided at least in one part of a region bounding the windbreak.

In a convertible of this type, at least one vehicle seat is now assigned a windbreak, this at least one windbreak being adapted to occupants who are on the vehicle seats, and an aerodynamic air-guiding device being provided at least on one side of the windbreak. This means that the air-guiding device can be situated on each part of the region bounding the windbreak. It can therefore be attached on the left, right or top of the windbreak, as seen in the direction of travel.

If an intention is to adapt the windbreak to occupants who are on the vehicle seats, this is to be understood as meaning that the shape and the position of the windbreak are adapted in essence to a generally applicable body shape, and do not have to be adapted in each case to a specific occupant. "Adapted" is intended here to express the fact that the shape and the position are assigned generally to an occupant and do not extend over the entire width of the vehicle.

In the case of the windbreak shape which is described according to certain preferred embodiments of the invention and is adapted to the occupants, firstly, the occupants are protected from the air flowing in from the rear, and secondly, sufficient space is given to the returning air for the purpose of pressure compensation in the cab. Aerodynamic guiding elements assist this recycling of the air in an advantageous manner, so that the occupants do not notice any annoying draft phenomena.

A shape of the windbreak in certain preferred embodiments can advantageously be adapted to the occupants in such a manner that air is guided from the rear into the vehicle cab, for example in the center of the vehicle between the occupants, for the purpose of pressure compensation, with the result that pressure compensation in the vehicle cab is ensured on account of the transporting of the air mass.

In this case, the reduction of the negative pressure, which arises during open-top driving, in the cab due to the targeted supplying of quantities of air into regions which are unproblematical for the occupants, for example the center of the vehicle, and therefore also a shifting upwards of the flow shearing layer can be achieved.

If an aerodynamic air-guiding device is provided at least on a side of the windbreak which faces the adjacent vehicle seat, a nozzle-type effect can be achieved between the windbreak on the driver's side and the passenger's side and so the air flowing back into the passenger compartment can be concentrated onto a region which is sufficiently remote from the occupants, with the result that a draft cannot get into the vicinity of the occupants.

Advantageous developments and refinements of the present invention emerge from the further claims, the description and the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
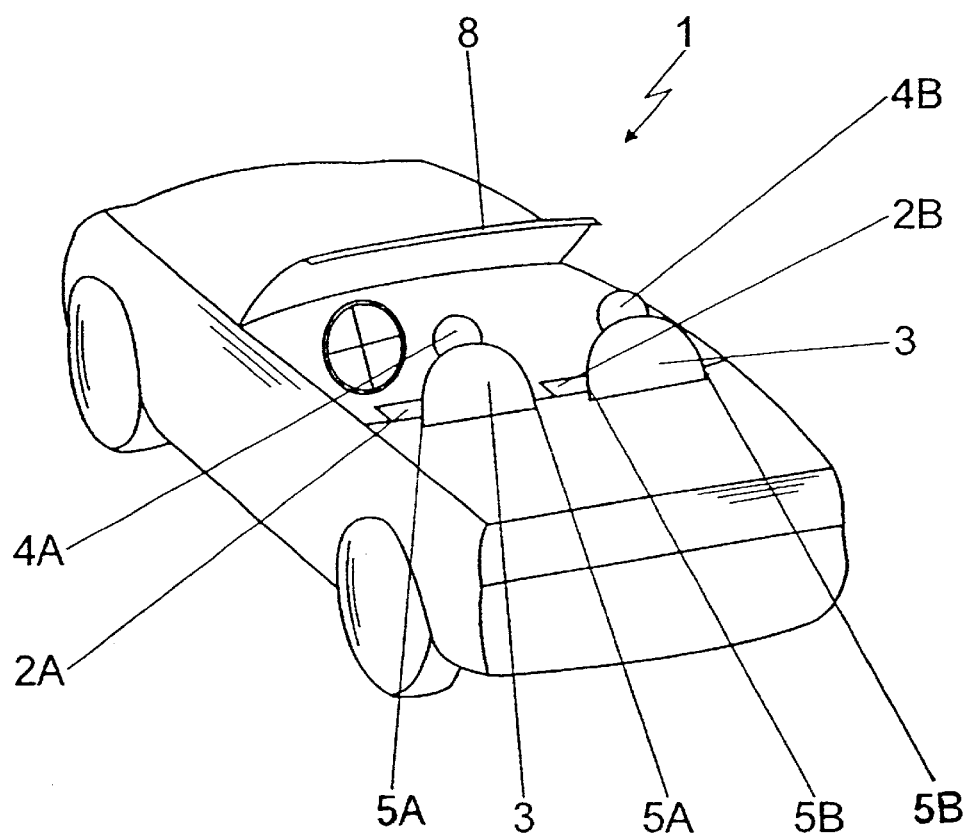
FIG. 1 shows a three-dimensional, greatly abstracted illustration of a convertible.
Figure 2:
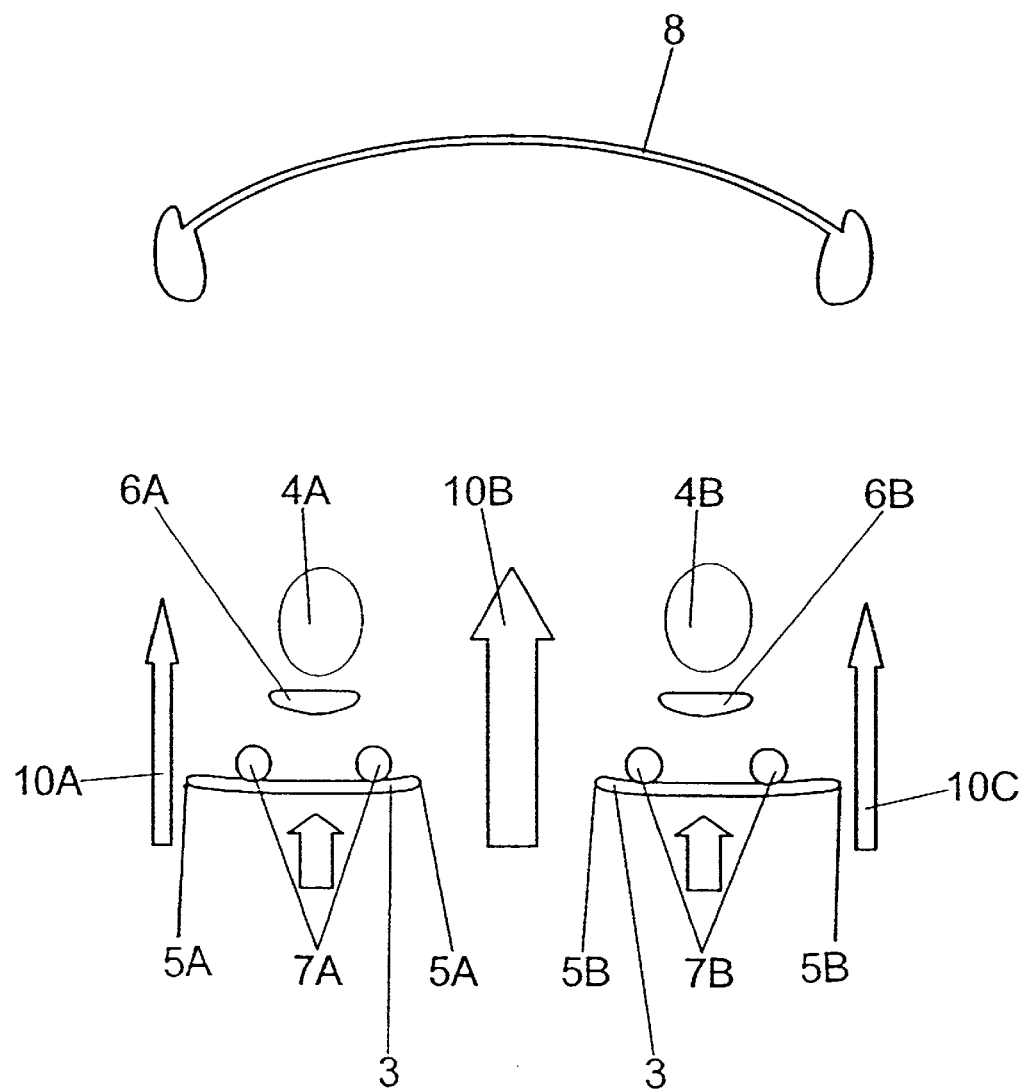
FIG. 2 shows a greatly simplified plan view of the convertible from FIG. 1 with a section approximately level with the head of an occupant, in accordance with a first embodiment of the present invention.

FIG. 1 and FIG. 2 show a convertible 1 which, by way of example here, is fitted with just two vehicle seats. In the case of this convertible 1 which is shown, both vehicle seats 2A, 2B are assigned a windbreak 3. In principle, the windbreak 3 is used here to prevent an air draft from the rear onto the head region and onto shoulders and necks of occupants 4A, 4B by virtue of the fact that the head and upper body of the occupants 4A, 4B lie in the "dead water region" of the windbreak.

In this case, the windbreak 3 is configured in such a manner that it is adapted in shape and position to the occupants 4A, 4B who are on the vehicle seats 2A, 2B. Moreover, the windbreak 3 is also configured in such a manner that an aerodynamic air-guiding device (not illustrated in FIGS. 1 and 2) is provided on the region 5A, 5B bounding the windbreak 3. This air-guiding device can be situated on the entire region 5A, 5B bounding the windbreak 3 or else just on one part thereof. In this case, the windbreak 3 is arranged in such a manner that it protrudes approximately vertically upwards from the vehicle floor, with the result that the occupants 4A, 4B who are on the vehicle seats 2A, 2B are protected against annoying swirling of the airstream from the rear.

In the present case, an aerodynamic air-guiding device means a type of aerodynamic aid which serves, in particular, for a better and more targeted guiding of air, in particular of the return flow, into regions of the cabin which are remote from the occupants, in order to compensate for a negative pressure in their cab.

As has already been explained, the use of a windbreak causes an increase in the negative pressure in the vehicle cab. As a result, depending in each case on the level of pressure difference, the flow shearing layer is drawn somewhat downwards into the vehicle cab. In order to avoid this, in the solution according to certain preferred embodiments of the invention, pressure compensation takes place in the vehicle cab through the targeted guiding of the air of the return flow. This is because the shape of the windbreak 3, which is described in the present case and is adapted to the occupants 4A, 4B, has the effect that air passes from the rear into the vehicle cab, in particular in the center of the vehicle, in the region of the two front occupants, pressure compensation in the vehicle cab being ensured on account of this transporting of the air mass.

The center of the vehicle is understood here as always being the region between two occupants. Apart from being assigned to front vehicle occupants, the windbreak 3, as described here, can also be assigned to rear vehicle occupants. In this connection, under some circumstances three seats in the rear region may also each be assigned a windbreak, in which case the center of the vehicle is then to be understood in each case as the region between adjacent occupants.

In flow engineering terms, the arrangement of the aerodynamic air guide or aid acts as a type of nozzle with which the recirculated air can be set in such a manner that the occupant 4A, 4B does not notice the returning air at all.

According to a preferred embodiment of the present invention which is shown, the windbreak 3 is of two-part design. Likewise, a one-part design of a windbreak with a horizontal connection in the lower windbreak region (not illustrated) is also conceivable, i.e. each vehicle seat 2 has been respectively assigned its own windbreak 3. However, a windbreak designed separately for each vehicle seat 2 has the advantage that each occupant in the vehicle can make a separate decision as to how he would like to set the height of a windbreak which can either be swung up and down or pushed up and down. If, for example, there is no occupant on the passenger's seat, the windbreak on the passenger's side can remain swung down, and a much better pressure compensation can therefore take place.

Figure 4:
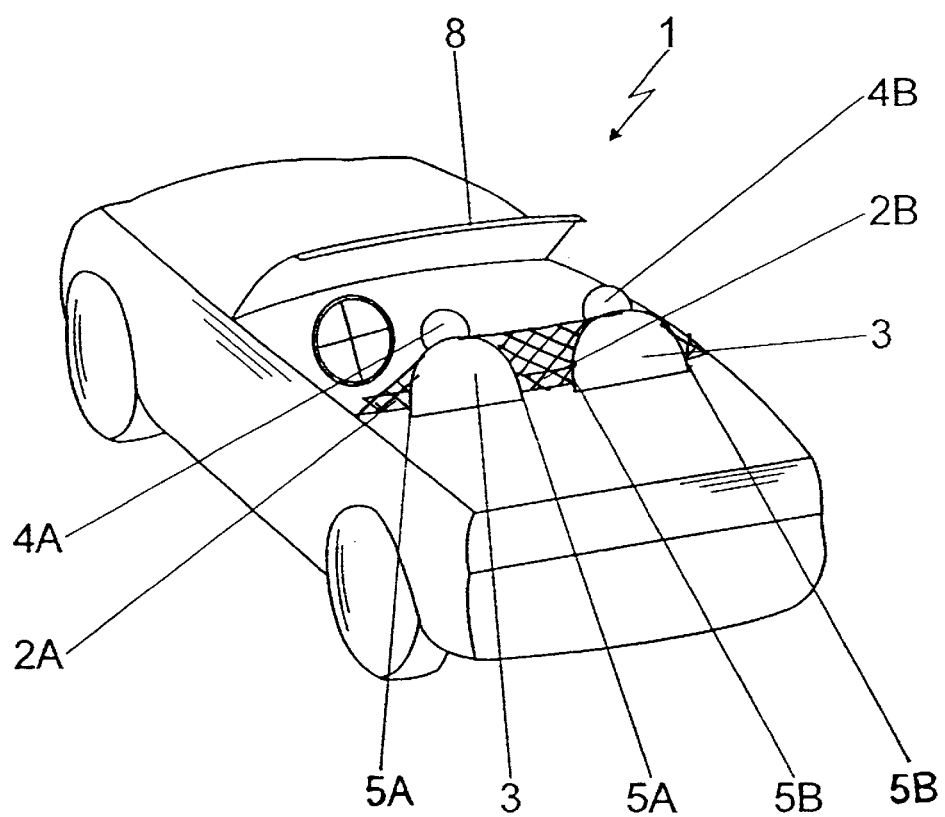
FIG. 4 shows another embodiment of a convertible in a rear view.

It is furthermore conceivable to provide a one-part windbreak whose air permeability is different in different regions and, as a result, lets the air into the vehicle cab in a targeted manner. It would be conceivable, for example, in the case of a one-part windbreak, to configure the region behind the head, neck and shoulders of the occupants to be air-impermeable, but to configure the region between the vehicle occupants to be air-permeable as in FIG. 4. It is thereby avoided that air from the rear produces annoying draft phenomena in the region of the vehicle occupants. At the same time, however, air is let into the center of the vehicle in a targeted manner in order to carry out a pressure compensation. The transitions between the regions of different air-permeability can be configured such that they are continuous, i.e. that the air-permeability becomes ever larger or smaller continuously.

It should be emphasized once again that the windbreak 3 can also likewise be used in four- and multi-seater convertibles, in which case the windbreak then has to be correspondingly adapted to the particular seat or to the seat bench having corresponding seat positions in order to obtain a windbreak shape which is adapted to a person's body.

Figure 5:
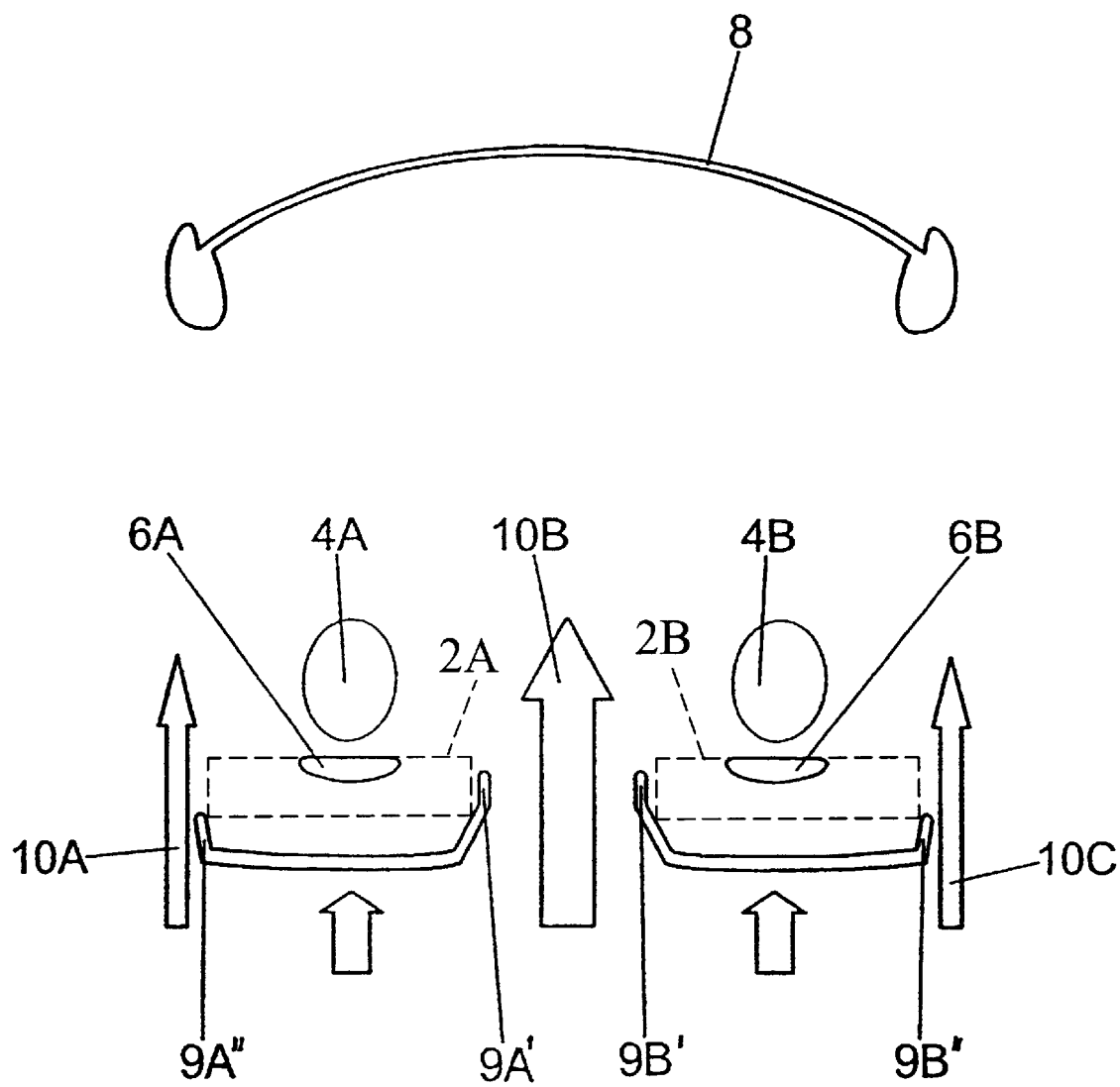
FIG. 5 shows a plan view according to a further embodiment.
Figure 6:
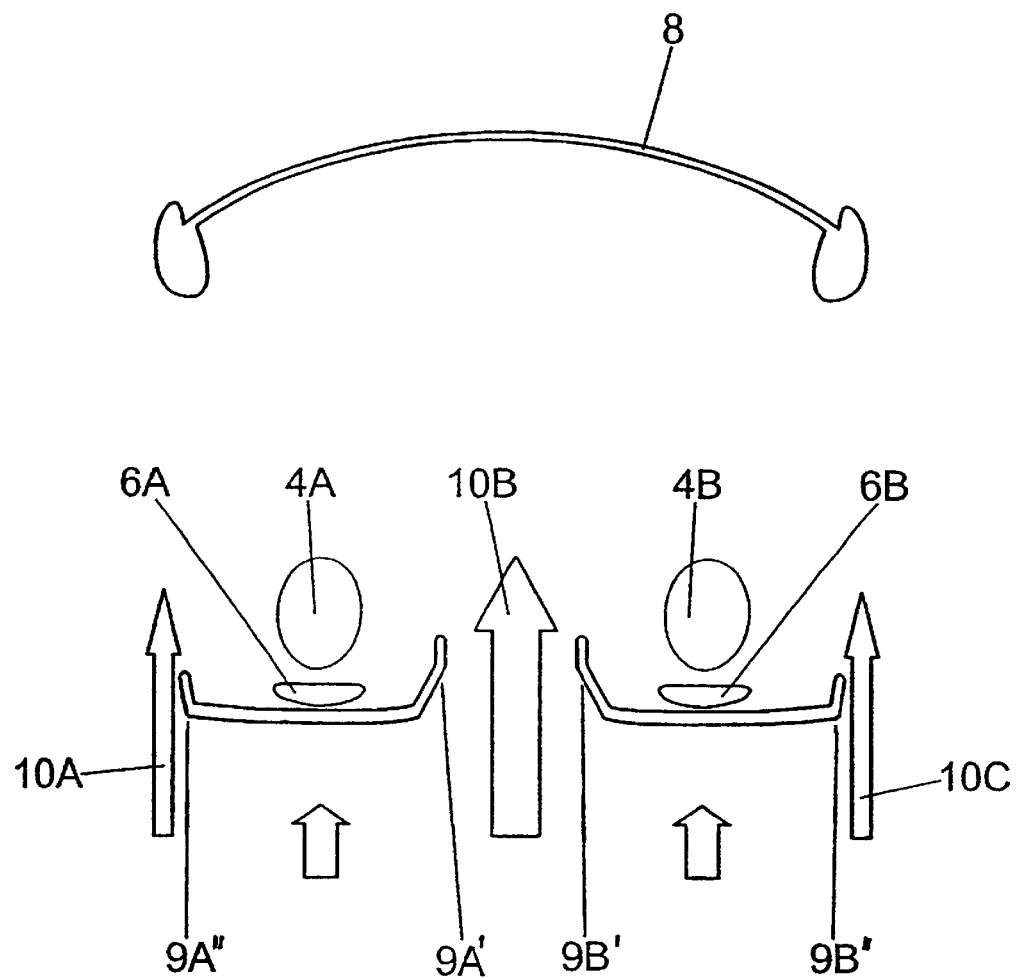
FIG. 6 shows a plan view according to a further embodiment.

As can be gathered in particular from FIG. 2, which illustrates a section of the vehicle 1 shown in FIG. 1, the windbreak 3 is fastened in each case to roll bars 7A, 7B assigned to the respective vehicle seats 2A, 2B. At the same time, it would, however, be likewise conceivable for the windbreak to be fastened to the vehicle seat 2 or to a neck rest 6A, 6B, as shown in FIGS. 5 and 6.

Figure 3:
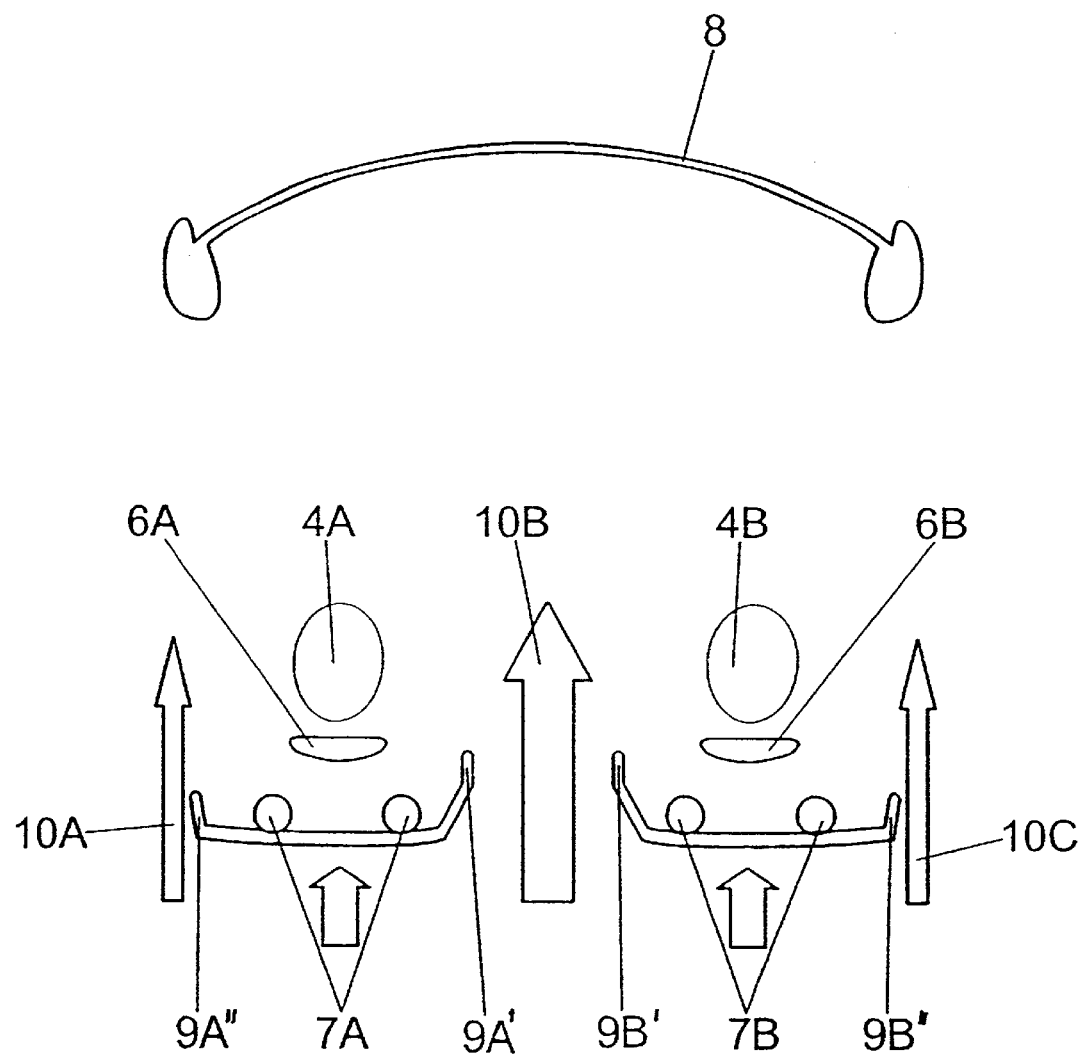
FIG. 3 shows a plan view corresponding to FIG. 2 of a convertible according to a further embodiment of the invention.

FIG. 3 shows a further embodiment of the present invention, components corresponding here to FIGS. 1 and 2 being provided with corresponding reference numbers.

In this case, it can be seen that the windbreak 3 has aerodynamic air-guiding devices 9A', 9B' on the side facing the adjacent vehicle seat 2A, 2B. As a result, it is possible for the air which flows back into the passenger compartment and is illustrated by the straight arrows 10A, 10B, 10C to be guided in each case into the vehicle cab in an extremely targeted manner. This means that the occupants 4A, 4B, who are in their normal position on the seats 2A, 2B, are not subjected to a draft, at least in their head, neck and shoulder region, while pressure compensation can take place through the central region. Moreover, according to this preferred embodiment which is shown, the windbreak 3, however, has aerodynamic air-guiding devices 9A", 9B" on the side facing away from the adjacent vehicle seat 2B, 2A, i.e. therefore on the side facing the vehicle side wall.

By configuring the windbreak 3 in such a manner, it is possible for an extremely targeted feeding of air for pressure compensation in the vehicle cab to be brought about not only into the central region of the vehicle, but also into the outer, lateral regions along the vehicle side paneling or side window. In this manner, pressure compensation in each case on both sides of the occupant 4A, 4B can take place in a particularly targeted manner. It is also conceivable only to undertake the pressure compensation via the guiding devices 9A", 9B" lying on the outside.

With regard to the selection of material for the windbreak 3 it should be noted that the said windbreak can be designed in any known manner. In the present case, the windbreak 3, according to certain preferred embodiments of the invention, is formed by an elastic net, but it may also be dimensionally stable and may, for example, be a wire mesh which makes possible a cost-effective windbreak which does not restrict the visibility, in particular for the driver of the vehicle.

The aerodynamic guiding elements 9A', 9B' and 9A", 9B" illustrated in FIG. 3 can be attached in a manner such that they can be adjusted or rotated, in order to increase or reduce the recirculation of air from the rear into the cab, in particular the nozzle effect between the guiding elements 9A' and 9B', depending in each case on the driving situation or where the occupants are. In addition, for reasons concerned with occupant protection, the guiding elements 9A', 9B' and 9A", 9B" should be designed in such a manner that any risk of injury is minimized. This means that the guiding elements should not have any sharp edges and should be made of flexible material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A convertible vehicle having at least one vehicle seat which is assigned a windbreak, wherein the at least one windbreak is adapted to an occupant who is on the vehicle seat, is disposed behind the occupant in a substantially transverse direction, and has a width in the transverse direction that is greater than its depth in a longitudinal direction of the vehicle, an aerodynamic air-guiding device being provided at least in one part of a region bounding the windbreak to guide a return flow into regions of a cabin, which are remote from the occupant, to compensate for a negative pressure in the cabin.

2. A convertible vehicle according to claim 1, wherein the aerodynamic air-guiding device is provided on a plurality of portions of the region which bounds the windbreak.

3. A convertible vehicle according to claim 1, wherein the aerodynamic air-guiding device is provided at least on one of one side facing an adjacent seat and one side facing away from the adjacent seat.

4. A convertible vehicle according to claim 1, wherein the aerodynamic air-guiding device is provided as part of the windbreak extending at a side of the vehicle seat in the longitudinal direction of the vehicle.

5. A convertible vehicle according to claim 2, wherein the aerodynamic air-guiding device is provided as part of the windbreak extending at a side of the vehicle seat in the longitudinal direction of the vehicle.

6. A convertible vehicle according to claim 3, wherein the aerodynamic air-guiding device is provided as part of the windbreak extending at a side of the vehicle seat in the longitudinal direction of the vehicle.

7. A convertible vehicle according to claim 1, wherein the aerodynamic air-guiding device is designed in such a manner to guide an air flow from a rear region of the windbreak to a side of the occupant an into a passenger compartment in a nozzle-like manner.

8. A convertible vehicle according to claim 2, wherein the aerodynamic air-guiding device is designed in such a manner to guide an air flow from a rear region of the windbreak to a side of the occupant an into a passenger compartment in a nozzle-like manner.

9. A convertible vehicle according to claim 3, wherein the aerodynamic air-guiding device is designed in such a manner to guide an air flow from a rear region of the windbreak to a side of the occupant an into a passenger compartment in a nozzle-like manner.

10. A convertible vehicle according to claim 4, wherein the aerodynamic air-guiding device is designed in such a manner to guide an air flow from a rear region of the windbreak to a side of the occupant an into a passenger compartment in a nozzle-like manner.

11. A convertible vehicle according to claim 1, wherein the aerodynamic guiding device is connected moveably to the windbreak.

12. A convertible vehicle according to claim 2, wherein the aerodynamic guiding device is connected moveably to the windbreak.

13. A convertible vehicle according to claim 3, wherein the aerodynamic guiding device is connected moveably to the windbreak.

14. A convertible vehicle according to claim 4, wherein the aerodynamic guiding device is connected moveably to the windbreak.

15. A convertible vehicle according to claim 7, wherein the aerodynamic guiding device is connected moveably to the windbreak.

16. A convertible vehicle according to claim 1, wherein the windbreak is fastened to one of the vehicle seat, a neck rest and a roll bar.

17. A convertible vehicle according to claim 2, wherein the windbreak is fastened to one of the vehicle seat, a neck rest and a roll bar.

18. A convertible vehicle according to claim 3, wherein the windbreak is fastened to one of the vehicle seat, a neck rest and a roll bar.

19. A convertible vehicle according to claim 11, wherein the windbreak is fastened to one of the vehicle seat, a neck rest and a roll bar.

20. A convertible vehicle according to claim 1, wherein the at least one windbreak is of one-part design for vehicle seats arranged next to each other.

21. A convertible vehicle according to claim 2, wherein the at least one windbreak is of one-part design for vehicle seats arranged next to each other.

22. A convertible vehicle according to claim 1, wherein the windbreak is designed separately for each of the vehicle seats.

23. A convertible vehicle according to claim 2, wherein the windbreak is designed separately for each of the vehicle seats.

24. A convertible vehicle according to claim 3, wherein the windbreak is designed separately for each of the vehicle seats.

25. A convertible vehicle according to claim 11, wherein the windbreak is designed separately for each of the vehicle seats.

26. A convertible vehicle according to claim 16, wherein the windbreak is designed separately for each of the vehicle seats.

27. A convertible vehicle according to claim 20, wherein the windbreak has regions of different air permeability.

28. A convertible vehicle according to claim 20, wherein the windbreak is air-impermeable in a region behind a head, neck and shoulders of the occupants and is air-permeable in a region between the vehicle occupants.

29. A convertible vehicle according to claim 27, wherein the windbreak is air-impermeable in a region behind a head, neck and shoulders of the occupants and is air-permeable in a region between the vehicle occupants.

30. A convertible vehicle according to claim 3, wherein the at least one windbreak is of one-part design for vehicle seats arranged next to each other.

31. A convertible vehicle according to claim 4, wherein the at least one windbreak is of one-part design for vehicle seats arranged next to each other.

32. A convertible vehicle according to claim 7, wherein the at least one windbreak is of one-part design for vehicle seats arranged next to each other.

33. A convertible vehicle according to claim 11, wherein the at least one windbreak is of one-part design for vehicle seats arranged next to each other.

34. A convertible vehicle according to claim 16, wherein the at least one windbreak is of one-part design for vehicle seats arranged next to each other.

35. A method of making a convertible vehicle, comprising:
assigning a windbreak to at least one vehicle seat, wherein the windbreak is disposed behind the occupant in a substantially transverse direction, and has a width in the transverse direction that is greater than its death in a longitudinal direction of the vehicle,
adapting the at least one windbreak to an occupant for the vehicle seat, and
providing an aerodynamic air-guiding device in at least a portion of a region bounding the windbreak.

36. A method according to claim 35, wherein the adapting includes adjusting a shape and a position of the windbreak to the occupant, and wherein the windbreak does not extend substantially over an entire width of the vehicle.

37. A method according to claim 35, wherein the occupant for the vehicle seat is a generally applicable body shape.

38. The method according to claim 35, wherein the occupant for the vehicle seat is a specific occupant.

39. The method according to claim 35, wherein the aerodynamic air-guiding device is provided as part of the windbreak extending at a side of the vehicle seat in the longitudinal direction of the vehicle.

40. The method according to claim 35, wherein the aerodynamic air-guiding device is designed in such a manner to guide an air flow from a rear region of the windbreak to a side of the occupant an into a passenger compartment in a nozzle-like manner.

41. The method according to claim 35, wherein the air-guiding device guides a return flow into a region of a passenger compartment remote from the occupant and compensates for negative pressure in the passenger compartment.

42. A windbreak assembly for a seat in a vehicle, comprising:

a windbreak assigned to the seat and positioned longitudinally behind the seat having a width in a transverse direction that is greater than its depth in a longitudinal direction of the vehicle, and
an air-guiding device provided on at least a portion of a region bounding the windbreak to guide a return flow into regions of a cabin, which are remote from the occupant, to compensate for a negative pressure in the cabin;
wherein the windbreak is adapted to the occupant on the seat.

43. The assembly according to claim 42, wherein another windbreak is assigned to another seat adjacent first said seat and both of the windbreaks form one part with varying air permeability, the windbreaks being less air permeable in areas directly behind the seats and more air permeable in a central area of the vehicle.

44. The assembly according to claim 42, wherein the air-guiding device is adjustable to alter a flow of air into the vehicle.

45. A method of operating a convertible having an adjustable windbreak, comprising:
occupying a vehicle seat by an occupant,
adapting the windbreak which is assigned to the vehicle seat to the occupant, wherein the windbreak is disposed behind the occupant in a substantially transverse direction, and has a width in the transverse direction that is greater than its depth in a longitudinal direction of the vehicle,
adjusting an aerodynamic air-guiding device which is provided at at least a portion of a region bonding the windbreak in order to compensate for negative pressure within the convertible.

46. A windbreak for a control of return air flow about an occupant seated in a cabin of a convertible vehicle, comprising:
a windbreak portion, wherein
the windbreak portion is disposed behind the occupant and is sized to substantially block return air flow directly onto the occupant, and
a width of the windbreak portion in a longitudinal direction of the vehicle is smaller than a width of the windbreak portion in a direction transverse to the longitudinal direction, and
an aerodynamic air-guiding portion, wherein the aerodynamic air-guiding portion
is disposed on a peripheral region of the windbreak, and extends from the windbreak portion forward in the longitudinal direction to guide return air flow into regions of the vehicle cabin remote from the occupant.

* * * * *